US008746664B2

(12) United States Patent
Rentz

(10) Patent No.: US 8,746,664 B2
(45) Date of Patent: Jun. 10, 2014

(54) SPRING ACTUATED LINK CLAMP

(75) Inventor: Matthew Rentz, Shelby Township, MI (US)

(73) Assignee: Delaware Capital Formation, Inc., Wilmington, DE (US)

(*) Notice: Subject to any disclaimer, the term of this patent is extended or adjusted under 35 U.S.C. 154(b) by 252 days.

(21) Appl. No.: 13/430,880

(22) Filed: Mar. 27, 2012

(65) Prior Publication Data

US 2012/0267838 A1 Oct. 25, 2012

Related U.S. Application Data

(60) Provisional application No. 61/478,165, filed on Apr. 22, 2011.

(51) Int. Cl.
*B23Q 3/08* (2006.01)

(52) U.S. Cl.
USPC ................. 269/32; 269/20; 269/24; 269/228; 269/41

(58) Field of Classification Search
CPC .............. B25B 5/12; B25B 1/14; B25B 1/20; B23Q 1/00; B23Q 3/08; B23Q 17/00
USPC ............ 269/32, 20, 24–27, 228, 49; 29/407.1
See application file for complete search history.

(56) References Cited

U.S. PATENT DOCUMENTS

| | | | | |
|---|---|---|---|---|
| 3,724,837 | A | 4/1973 | McPherson | |
| 4,637,597 | A | 1/1987 | McPherson et al. | |
| 4,905,973 | A | 3/1990 | Blatt | |
| 5,165,670 | A | 11/1992 | Sawdon | |
| 4,905,973 | B1 | 7/1994 | Blatt | |
| 5,876,025 | A * | 3/1999 | Yonezawa | 269/24 |
| 6,059,277 | A | 5/2000 | Sawdon et al. | |
| 6,439,560 | B2 * | 8/2002 | Sawada et al. | 269/32 |
| 6,557,841 | B2 | 5/2003 | Dellach et al. | |
| 6,612,557 | B2 | 9/2003 | Sawdon et al. | |
| 6,719,281 | B2 | 4/2004 | Kohlert | |

(Continued)

FOREIGN PATENT DOCUMENTS

| | | |
|---|---|---|
| DE | 299 20 639 | 3/2000 |
| DE | 102 58 024 | 7/2004 |

(Continued)

*Primary Examiner* — George Nguyen
(74) *Attorney, Agent, or Firm* — Harness, Dickey & Pierce, P.L.C.

(57) ABSTRACT

A clamp has a housing with a piston assembly positioned in the housing. A detent mechanism is coupled with the piston rod and is positioned in the housing. A clamping arm is coupled with the piston rod. The clamping arm is moved by a biasing mechanism from a position parallel to the piston rod, when in a retracted position, to a position substantially perpendicular to the piston rod, when in a clamping position.

11 Claims, 8 Drawing Sheets

(56) References Cited

U.S. PATENT DOCUMENTS

| | | | | |
|---|---|---|---|---|
| 6,739,587 | B2 | 5/2004 | Migliori | |
| 6,758,467 | B2 * | 7/2004 | Kitaura | 269/20 |
| 6,908,077 | B2 | 6/2005 | Sawdon | |
| 7,029,000 | B2 * | 4/2006 | Petit et al. | 269/47 |
| 7,108,255 | B2 * | 9/2006 | Zajac et al. | 269/32 |
| 7,175,169 | B2 | 2/2007 | Yonezawa | |
| 8,132,801 | B2 * | 3/2012 | Miyashita et al. | 269/49 |
| 8,176,616 | B2 * | 5/2012 | Stevenson et al. | 29/559 |
| 8,459,626 | B2 * | 6/2013 | Sawdon et al. | 269/228 |
| 2004/0061268 | A1 * | 4/2004 | Sawdon | 269/32 |
| 2005/0225017 | A1 * | 10/2005 | Sakamoto | 269/32 |
| 2005/0230893 | A1 * | 10/2005 | Zajac et al. | 269/32 |
| 2007/0205549 | A1 * | 9/2007 | Doan et al. | 269/32 |
| 2009/0096149 | A1 | 4/2009 | Miyashita et al. | |

FOREIGN PATENT DOCUMENTS

| | | |
|---|---|---|
| EP | 0 216 710 | 4/1987 |
| EP | 1 048 412 | 11/2000 |
| EP | 1 595 640 | 11/2005 |
| EP | 2 177 319 | 4/2010 |
| WO | WO2011/149759 | 12/2011 |

* cited by examiner

SPRING ACTUATED LINK CLAMP

CROSS-REFERENCE TO RELATED APPLICATION

This application claims the benefit of U.S. Provisional Application No. 61/478,165, filed on Apr. 22, 2011. The entire disclosure of the above application is incorporated herein by reference.

FIELD

The present disclosure relates to clamps and, more particularly, to a link clamp.

BACKGROUND

Various types of clamping devices exist. Ordinarily, they include a clamping arm that is fixed to a piston rod assembly. The arm may pivot through a small angular movement from a clamped to an unclamped position. Additionally, the clamps may include fixed arms wherein the workpiece is moved in and out of the clamp head as the clamp moves between an opened and a closed position.

These clamps do not provide for an application where the clamp arm is positioned and retracted through an aperture in a fixture. These clamps do not enable the arm axis to move parallel with the piston rod axis.

The present disclosure provides a clamp that enables the clamping arm to move through an aperture in a fixture to a use position. The clamping arm is then retracted through the aperture. The clamping arm moves from a position where its longitudinal axis is parallel to the piston rod axis to a position where the axes are perpendicular to one another. The present disclosure provides a clamp that can be locked in position for an extended period of time without the use of fluid pressure. The present disclosure provides a clamp that has multiple orientations enabling it to be utilized in multiple positions.

SUMMARY

Accordingly to an aspect of the disclosure, a clamp comprises a housing that includes a piston assembly. The housing includes a cylindrical body and a head assembly. The piston assembly includes a piston rod moving between a first and a second position. A detent mechanism is coupled with the piston rod. The detent mechanism holds the piston rod in a retracted position in the housing. An arm is coupled with the piston rod. The arm moves between a clamped and an unclamped position. The arm defines a longitudinal axis. The longitudinal axis moves from a position parallel to the piston rod to a position perpendicular to the piston rod. A link is coupled with the arm and the housing. The link moves the arm into a position perpendicular to the piston rod. The biasing member in the housing maintains the arm in a clamping position. The piston rod includes a recess. The detent mechanism comprises a second piston movable in the housing in a direction perpendicular to the rod. The second piston includes an elongated member for engaging the rod holding the rod in position. Alternatively, the detent mechanism may comprise a second piston movable in a housing in a direction perpendicular to the piston rod. The second piston includes an elongated member or pin to engage the rod recess to hold the rod in position. A bore is formed in the piston rod with a contacting member in the bore. The detent mechanism includes a plunger coupled with the housing to couple and release with the contacting member of the piston rod. At least one ball is in the plunger for coupling and releasing the contact member. The plunger includes a pin slidable in the plunger. The pin moves the at least one ball into its coupling and release position. The pin is coupled with the second piston. The second piston is movable in the housing to move the pin.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
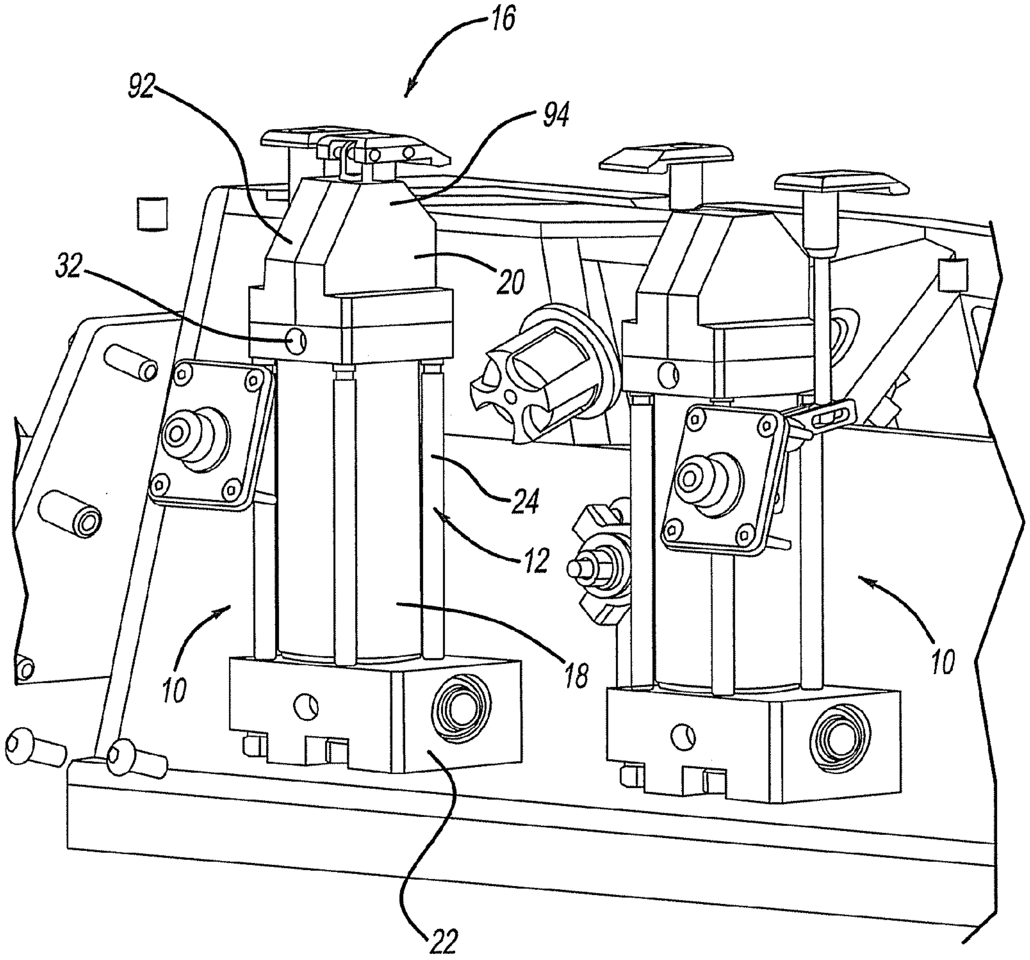
FIG. 1 is a perspective view of the clamp in accordance with the present disclosure.

Turning to the figures, a link clamp is illustrated and designated with the reference numeral 10. The link clamp includes a body 12, a piston assembly 14, and a clamping arm 16. The body 12 includes a cylinder housing 18 and a head 20. The cylinder housing 18 houses a portion of the piston assembly 14. The housing 18 includes a block 22. A plurality of supports 24 extend between the head 20 and block 22 to secure the body 12 together. The housing 18 defines a cylinder bore 26 to receive the piston assembly 14. Additionally, the housing block 22 includes a bore 28 that receives a detent mechanism 30. The head 20 includes a bore 32 that enables the ingress and egress of fluid into the housing 18 to move the piston assembly 14 between its first and second position.

The head 20 includes a seal 38 positioned at one end of the cylindrical bore 26 sealing the cylindrical bore 26 and housing 18 with the head 20 at that end. The supports 24 secure the head 20, cylinder 18 and block 22 together so that the seal 38 is in a sealing tight relationship with the housing 18.

The piston assembly 14 includes a piston rod 42, a piston 44 and piston seals 46, 48. The piston rod has a first portion 52 and a second portion 54 with the piston 44 between the two. Seal 48 is positioned on the interior of the piston 44 sealing the piston 44 with the piston rod 42. The piston assembly 14 moves between an open and closed position as illustrated in FIGS. 3-7. As fluid enters the cylindrical bore 26, the piston rod 42 moves downwardly, against a biasing member 58, moving the clamping arm 16 from a clamped to an unclamped position.

The piston rod 42 is stepped between the first and second portions 52, 54 forming a shoulder 50 on which the piston 44 nests. The piston rod 42 portion that extends through the piston 44 connects with the clamping arm 16. The second portion 54 has a plunger head 55 at its end. A circumferential recess 56 is formed in the second portion 54 of piston rod 42 adjacent the plunger head 55 A biasing member or spring 58 is positioned around the second piston rod portion 54 between the bottom of the piston 44 and the block 22. The spring 58 enables the clamping device to remain clamped for a long period of time without air or fluid present in the cylinder 18. Thus, the spring 58 provides the clamping force on the part. Fluid pressure will overcome the spring force to retract the clamp into the cylinder. The spring force applies a clamping force of about 30 lbs.

The block 22 includes a bore 60 transverse to the axis of the piston rod 42. The bore 60 includes an enlarged portion 62 that receives the detent mechanism 30. A reduced diameter portion 64 enables a portion of the detent mechanism 30 to extend into a bore portion 66 that receives the plunger head 55 of the piston rod 42.

Figure 3:
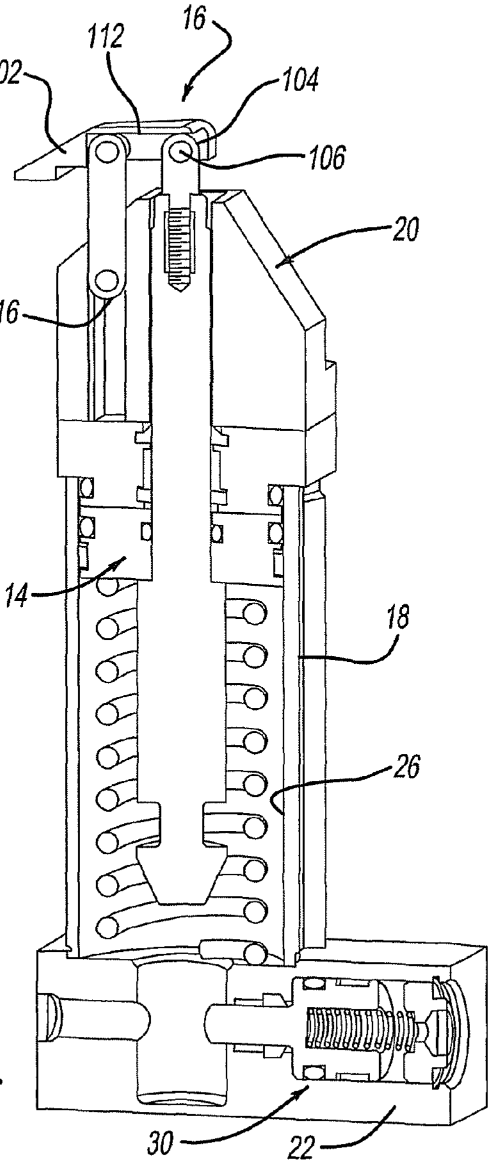
FIGS. 3-7 are cross-section views along line 3-3 of FIG. 2 with the piston rod moving between a clamping and retracted position.

The detent mechanism 30 includes a piston 70 with an extending arm 72. The piston 70 includes a bore 74 that receives a biasing spring 78. The spring 78 is biased against an end cap 80. The end cap 80 includes a bore 82 that enables fluid to exit from the cylinder cavity 84 when the detent mechanism is released. The block 22 includes another bore 86 that is connected with a fluid source to enable fluid to pass into the bore 66 and 26. The fluid enters through the bore 86, pushing the detent mechanism 30 against spring 78. As this occurs, the piston plunger head 55 is released from the arm 72 as the arm 72 and piston 70, due to fluid pressure, are retracted into the cylinder cavity 84. This enables the piston assembly 14 to move into the clamped position as illustrated in FIG. 3. Here, the piston rod 42 is released from the detent 30 enabling the spring 58 to push against the bottom of the piston 44, upward, moving the arm 16 into its clamping position.

Figure 5:
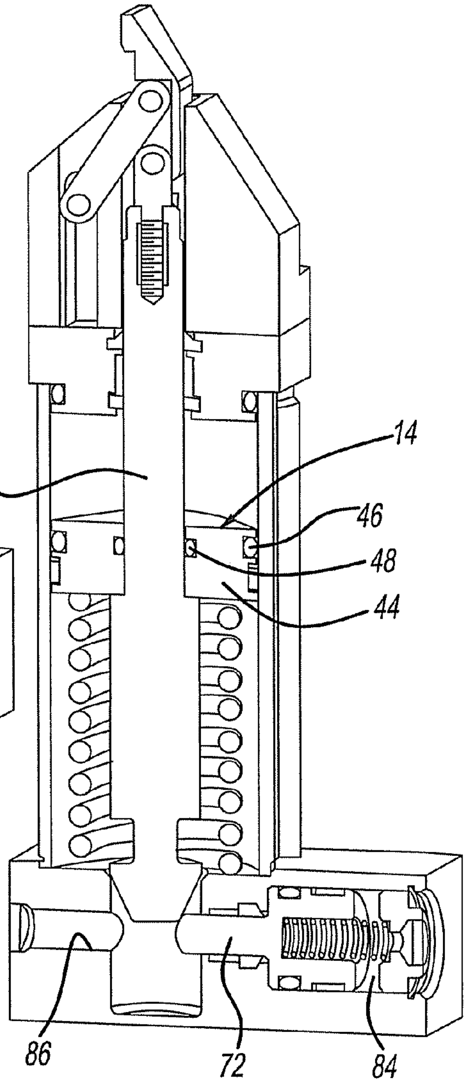
Figure 6:
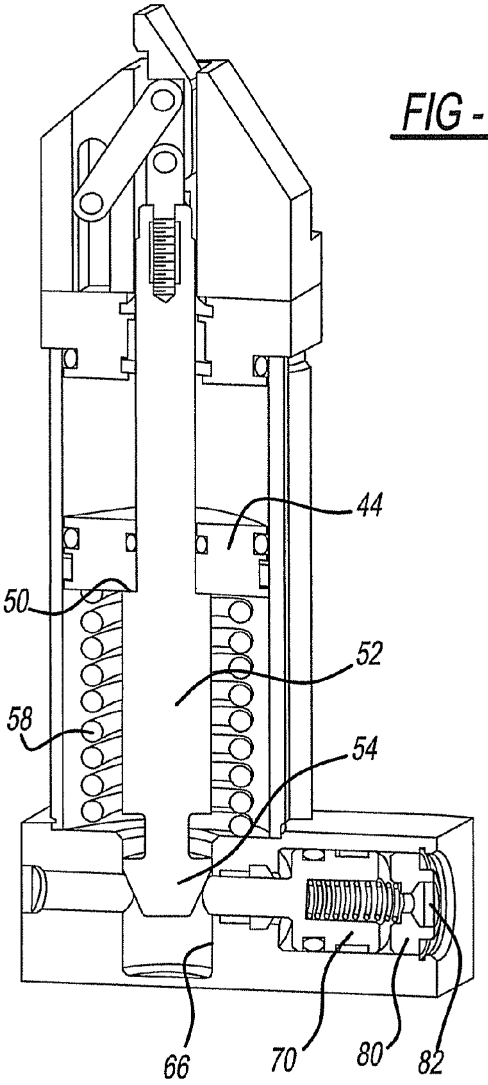
Figure 7:
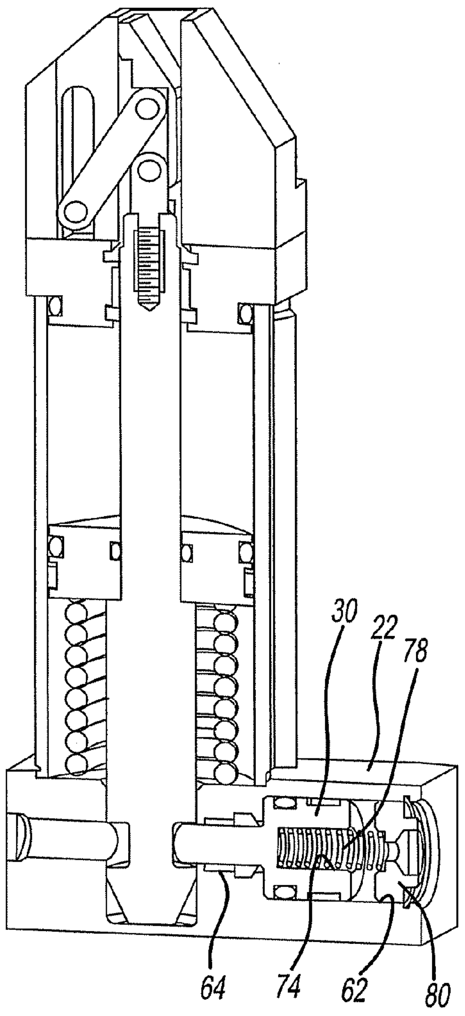
Figure 8:
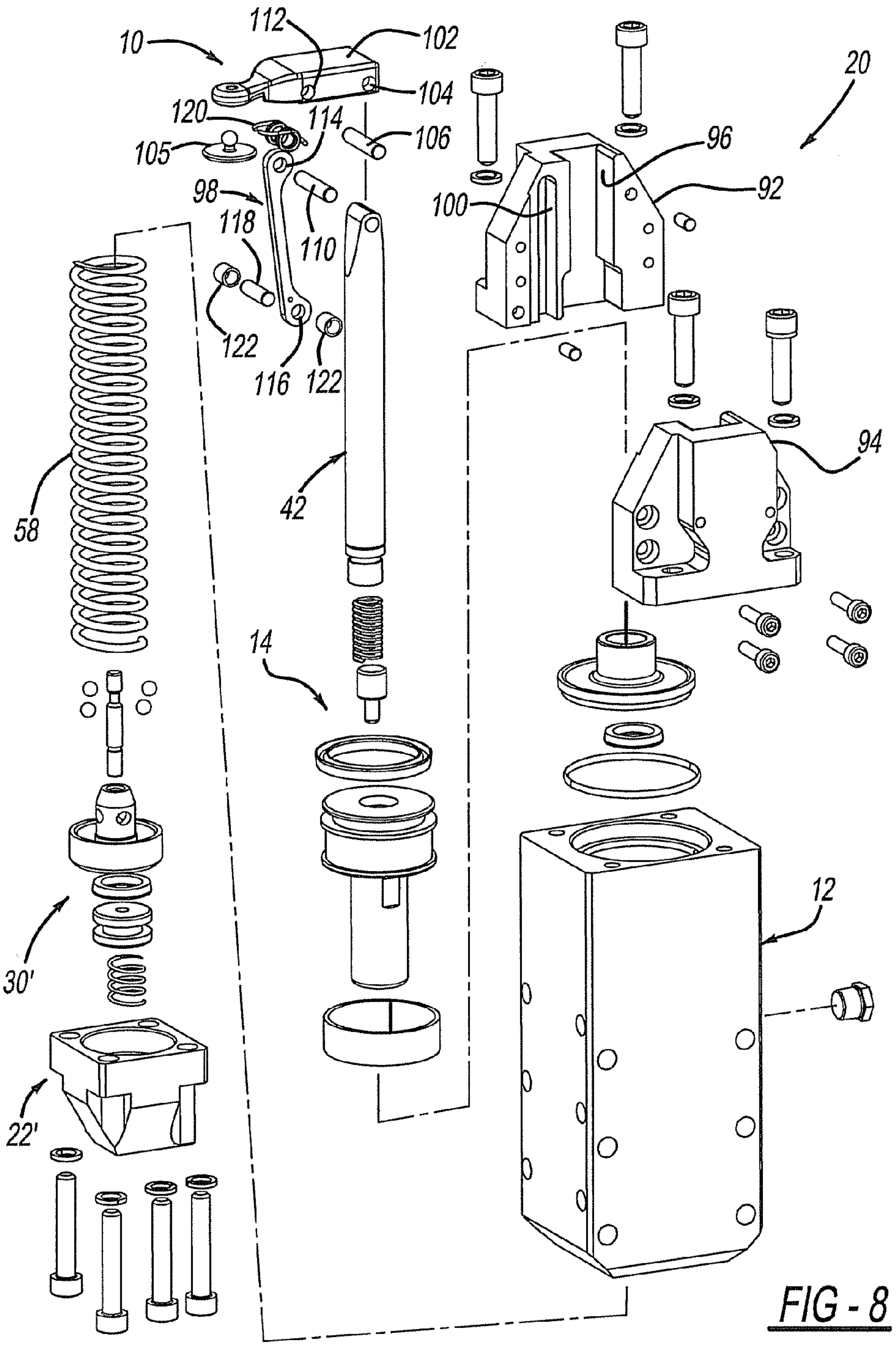
FIG. 8 is an exploded view of a second embodiment.

In order to move the arm 16 to its retracted position, fluid enters the head 20 via bore 32. The fluid pressure pushes against the top of the piston 44 pushing against the spring 58. The fluid pressure builds until it overcomes the force of the spring 58 pushing the plunger head 55 pass the arm 72, locking the arm 72 in recess 56 (FIGS. 5-7). Thus, the fluid supply can be terminated at this time with the piston rod 42 locked in position. Equally, fluid pressure is terminated in the other direction when the piston rod 42 is released to go into the clamping position. Thus, the arm 16 may be in a clamping position for an indefinite amount of time with the fluid pressure in an off position.

The housing head 20 includes a pair of body halves 92 and 94. The body halves 92, 94 define a channel 96 that enables movement of the piston rod 42 through the housing head 20. An additional channel 100 is formed by the body halves 92, 94. The channel 100 enables movement of a retaining link 98.

The arm assembly 16 includes an arm 102 having an elongated configuration. At one end, the arm 102 includes a pair of apertures 104 that receive a pin 106 that retains the arm onto the piston rod 42. The other end of the arm 102 includes a pressing member 105. The piston rod 42 includes an aperture 108 that receives the pin 106 fixing the arm 102 to the piston rod 42.

A retaining link 98 is coupled with the arm 102. A pin 110 passes through apertures 112 in the arm 102 and aperture 114 in the retaining link 98 to secure one end of the retaining link 98 with the arm 102. Additionally, a biasing member, such as a torsion spring 120, is secured by the pin 110 with the arm 102. The retaining link 98 includes a second end with an aperture 116. The aperture 116 receives a pin 118 that includes bushings 122. The bushings 122 fit into the channel 100 so that the retaining link 98 moves in the channel 100 in response to movement of the piston rod 42. The torsion spring 120 maintains the arm 102 in a first or unclamped position such that the arm axis 104 is parallel with the piston axis 106. Thus, the detent member 30 maintains the arm in the retracted position illustrated in FIG. 7.

Figure 2:
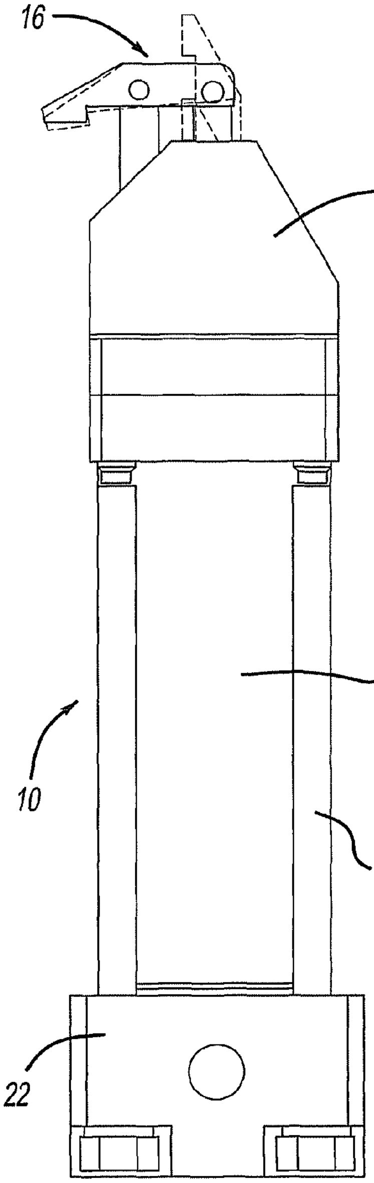
FIG. 2 is an elevation view with the clamping arm in a clamping position.
Figure 4:
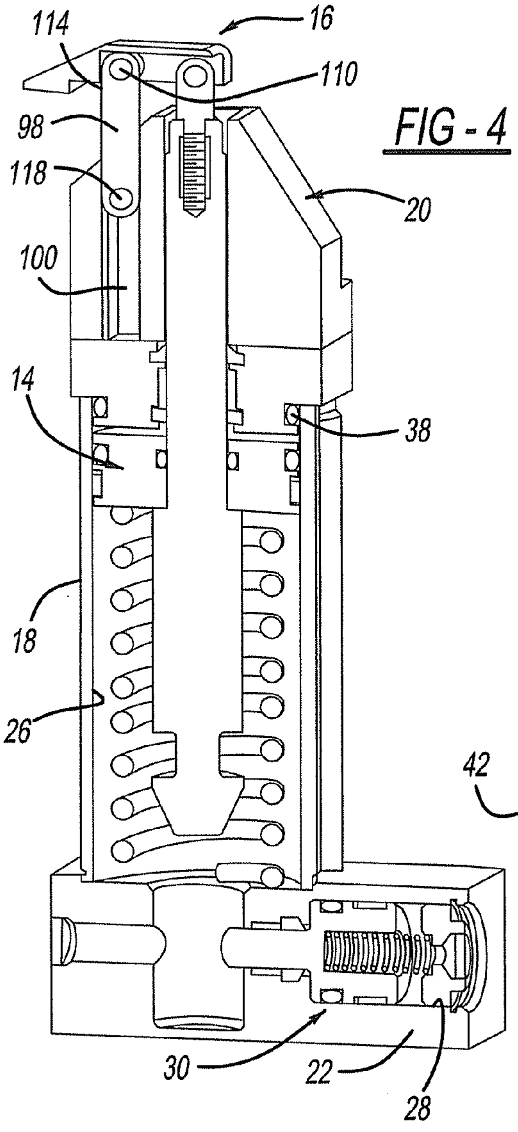

The clamp 10 is in a stowed or retracted position illustrated in FIGS. 1 and 7. As can be seen, the clamping arm 102 is flush with the fixture in the stowed, unclamped or retracted position. When the arm 102 is in the retracted position, no more than a 3 mm gap is permissible between the arm 102 and the fixture. When the clamp 10 is activated, the detent mechanism 30 is activated to release the piston rod 42 enabling it to move within the cylinder bore 24 of the housing 18. The spring 58 acts on the piston 44 moving the piston rod 42 upward toward its second position. As this occurs, the arm 102, still in a position with its axis parallel with the piston rod axis, moves upward as seen in FIG. 5. The torsion spring 120 maintains the arm 102 in the parallel position illustrated in FIGS. 5-7. As the piston rod 42 reaches the top of its stroke, the link pin 98, via bushing 122, contacts the end of the channel 100 as seen in FIG. 4. As this occurs, the retaining link 98 pivots the arm 102 in a position such that its axis 104 is substantially perpendicular to the axis 106 of the piston rod 42 as illustrated in FIG. 3. Fluid pressure is released once the piston rod 42 moves upwardly. The clamp 10 is now in its clamping position as seen in FIGS. 1-3.

Thus, the arm 102 is locked in a clamping position with the use of spring 58. The clamp 10 is designed to operate in a vacuum at temperatures of approximately 300°. The clamp 10 does not include any external lubrication nor does it include a Teflon® coating or lubricant. The arm 102 is smooth and free from sharp edges or burrs.

Turning to FIGS. 8-11, a second embodiment of the spring actuated clamp is illustrated. The parts which are the same as those previously discussed will include the same reference numerals.

The link clamp 10' includes a body 12, piston assembly 14 and a clamping arm 16. The body includes a cylinder 18', a head 20, and a block 22'. The cylinder 18' includes ports 202 and 204 to enable air to pass into and out of the cylinder 18' cavity. A seal 206 is positioned between the cylinder 18' and the head 20 to seal the cylinder 18' with the head 20.

The piston assembly 14' includes a piston rod 42 and a piston 44. The piston rod 42 has a first piston portion 252 and a second piston portion 254. The piston assembly 14' moves between an open and closed position like that explained above.

A biasing member or spring 58 is positioned around the piston rod portion 254 between the bottom of the piston 44 and the block 22'. A spring functions as previously described.

The second portion of the piston rod 254 includes a bore 256 that receives a biasing member or spring 258. The bore 256 extends into a reduced bore portion 260 that extends out into an increased bore portion 262. A contact member 270 is positioned in the bore 256. The contact member 270 is biased by the spring 258. The contact member 270 includes a rod portion 272 that projects through the small bore portion 260. The rod portion 272 extends into the enlarged bore portion 262. The rod portion 272 connects with the detent 30' as will be described later.

The block 22' includes a bore 60' co-linear to the axis of the piston rod 42. The bore 60' includes an enlarged portion 62' that receives the portion of the detent mechanism 30'. A reduced diameter portion 64' receives an additional portion of the detent mechanism 30'.

The detent mechanism 30 includes a plunger 280. The plunger 280 includes a plurality of balls 282. The balls 282 move radially inward and outward with respect to a circumferential surface of the plunger 280. The plunger 280 includes an annular flange 286 that retains the plunger 280 in block bore 62'. A pin member 284 includes a groove 288. The groove 288 receives the balls 282. A piston 290 is positioned in the small diameter bore 64', which forms a cavity. The piston 290 includes the pin member 282. Additionally, biasing spring 294 is positioned within a bore 67' that is continuous with the bore 64' cavity. The biasing spring 294 biases the piston 290 between the wall portion of the piston 290 and the block 22'. An air port 298 in the block 22' enables fluid to enter into the cavity 64' to provide a fluid force or pressure against the piston 290.

Figure 10:
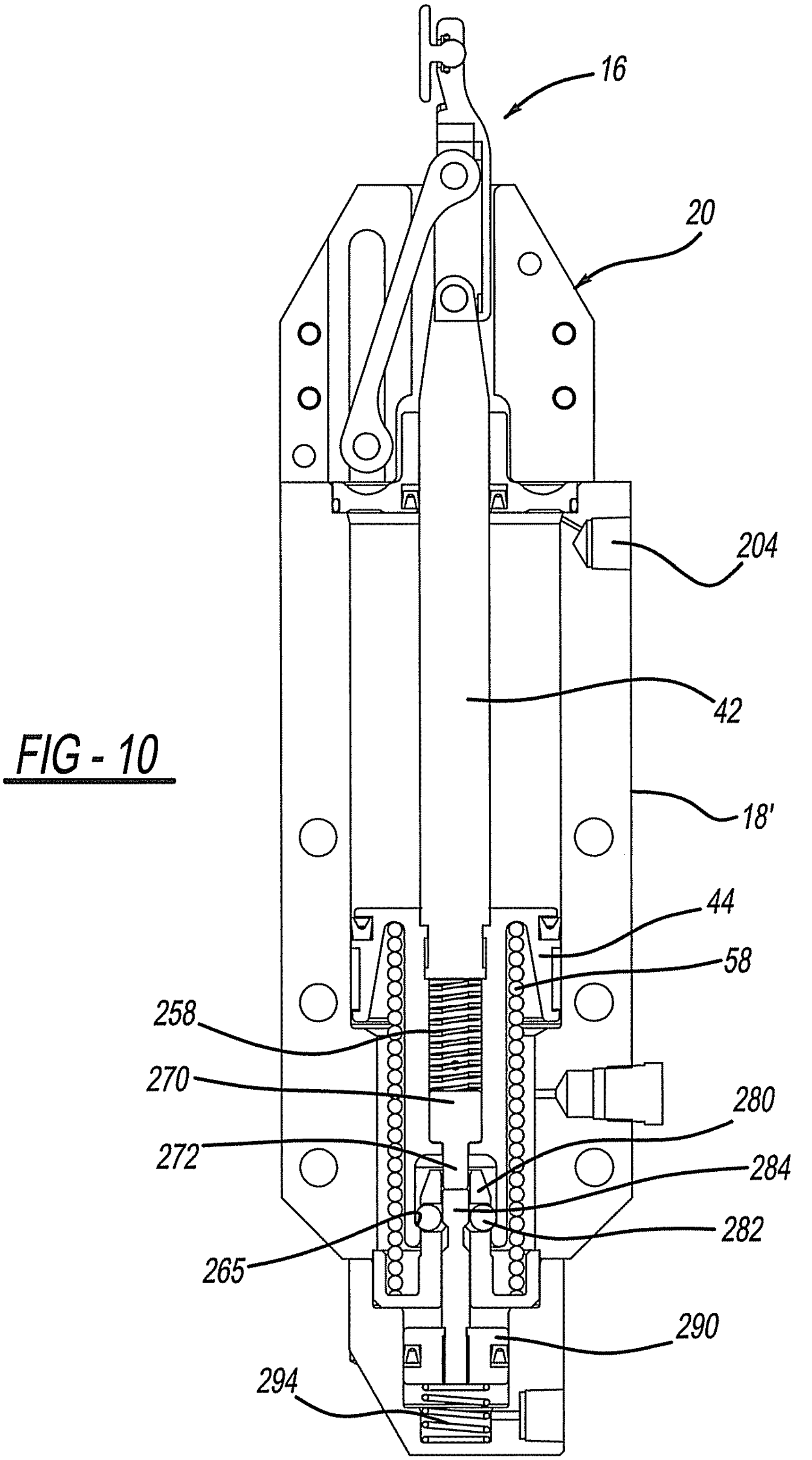

In order to move the arm 16 to its retracted position, fluid enters port 204, forcing the piston 44 downward toward block 22'. The fluid pressure pushes against the top of the piston 44 pushing against the spring 58. The fluid pressure builds until it overcomes the force of the spring 58. As this occurs, the enlarged bore portion 262 begins to slide over the plunger head 280. This continues until the contacting member 260 contacts the pin member 284. As this occurs, the contacting member 260 forces the pin member 284, as well as the piston 280, downward against the spring 294 into block 22'. As this occurs, the pin member 284 moves downwardly ejecting the balls 282 from the groove 288, as seen in FIG. 10, so that the balls 282 are in contact with the top wall surface 265 that defines the enlarged bore 262. The piston assembly 14', via the balls 282, is connected with the detent mechanism 30'. At this time, power and/or fluid pressure may be terminated to the piston assembly 14'. Thus, the piston assembly 14 is locked in its retracted position, as seen in FIG. 10.

Figure 9:
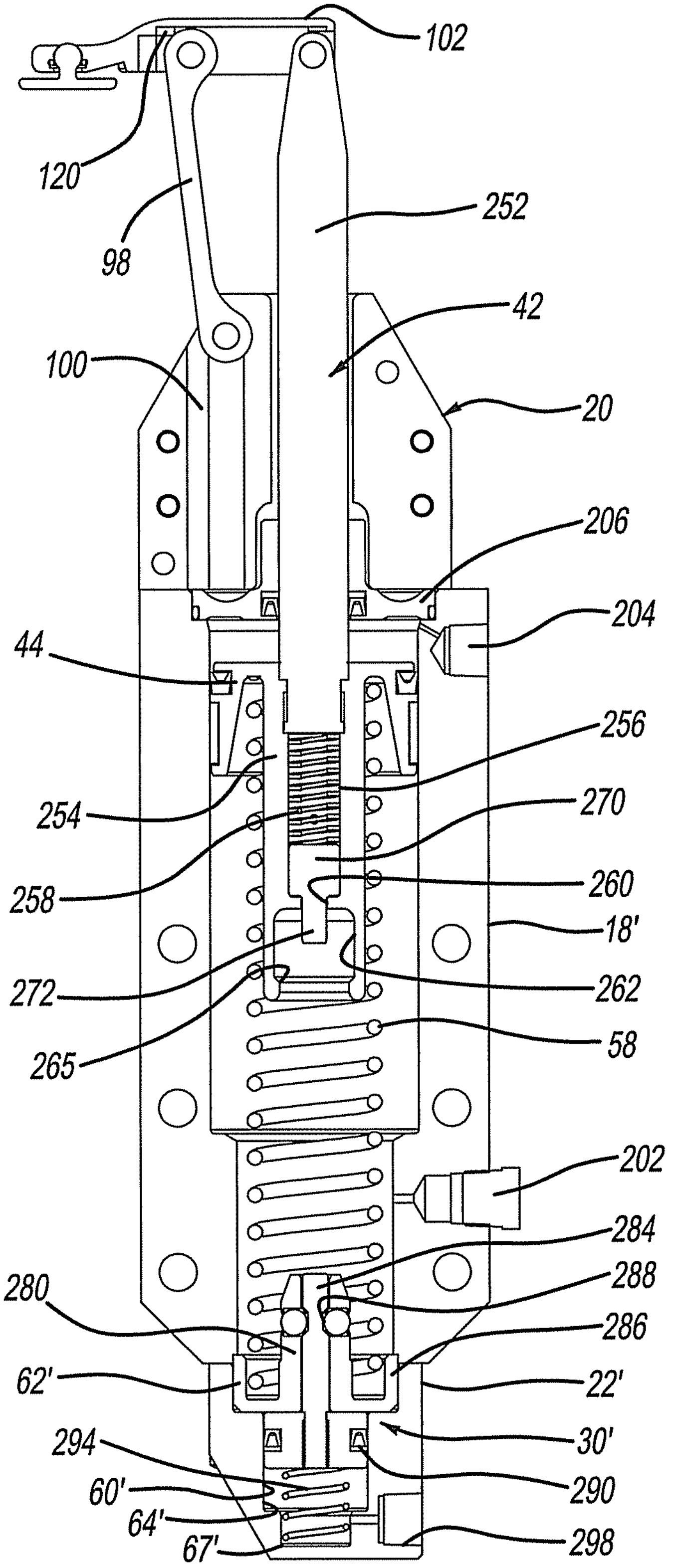
FIGS. 9-11 are cross-sectional views of FIG. 8 in a clamping and retracted position.
Figure 11:
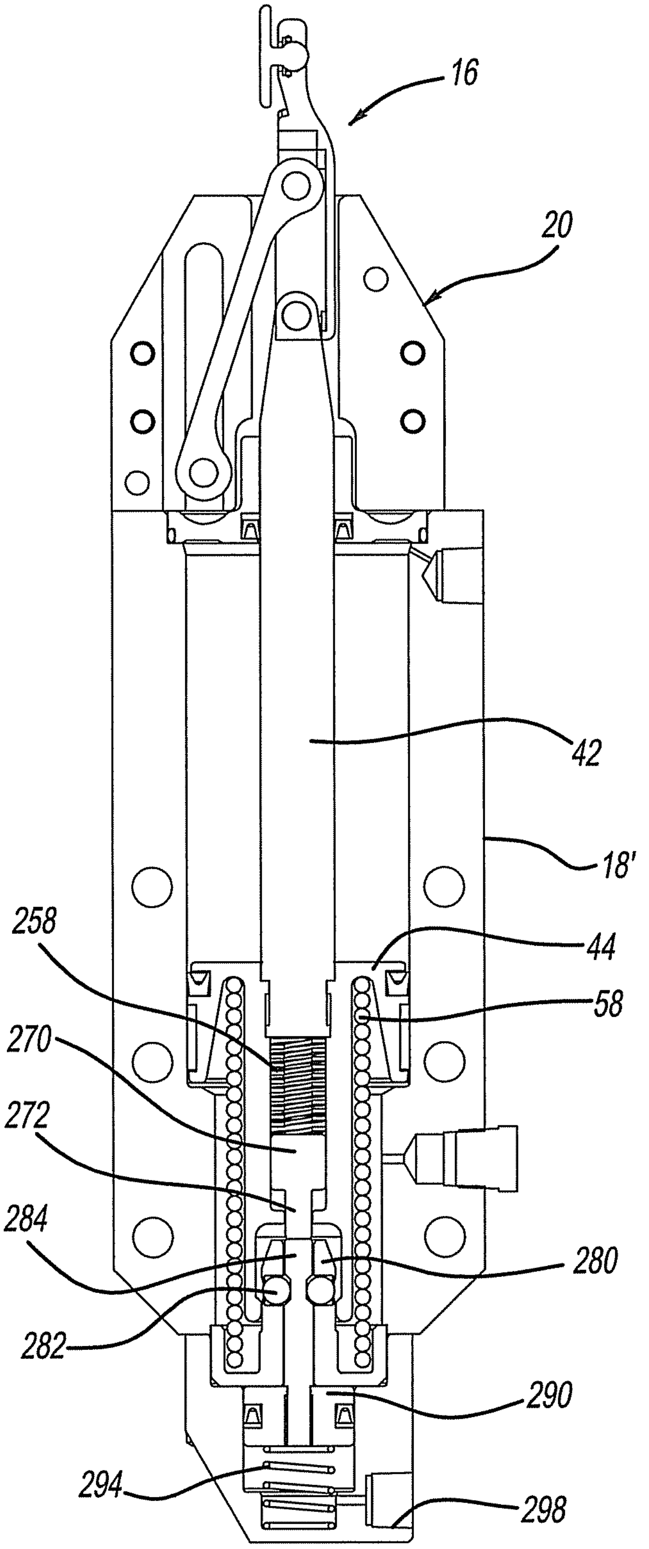

In order to move the arm 16 to its opened position, fluid enters through port 298 into the cavity 64' through bore 67'. As this occurs, the fluid pressure builds forcing the piston 290 to move the pin member 284 upward into its released position, as seen in FIG. 11. As this occurs, the balls 282 drop into the groove 288. This enables the spring 58 to force the piston 44 upward into a locked position, as illustrated in FIG. 9. Here, the piston rod 42 is released from detent 30' enabling the spring 58 to push against the bottom of the piston upward moving the arms 16 into its clamping position.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A clamp comprising:

a housing;

a piston assembly in the housing, the piston assembly including a piston rod having a first and second portion, the piston assembly moving between a first and second position;

a detent mechanism coupling with the first portion of the piston rod for locking the piston assembly in the first or second position; and an arm coupled with the second portion of the piston rod, the arm moving between a clamped and an unclamped position as the piston assembly moves between its first and second position, said arm defines a longitudinal axis and the longitudinal axis moves from a position parallel to the piston rod, when in a retracted position, to a position perpendicular to the piston rod, when in a clamping position.

2. The clamp of claim 1, further comprising a biasing member that maintains the arm in the position parallel to the piston rod.

3. The clamp of claim 1, further comprising a link coupled with the arm and the housing, the link moving the arm into the position perpendicular to the piston rod.

4. The clamp of claim 1, wherein the housing includes a cylinder body and a head assembly.

5. The clamp of claim 1, further comprising a biasing member in the housing for maintaining the arm in the clamping position.

6. The clamp of claim 1, wherein the first portion of the piston rod includes a recess.

7. The clamp of claim 1, where the detent mechanism further comprises a second piston movable in the housing in a direction perpendicular to the piston rod, the second piston including an elongated member for engaging the rod recess for holding the rod in position.

8. A clamp comprising:

a housing;

a piston assembly in the housing, the piston assembly including a piston rod having a first and second portion, the piston assembly moving between a first and second position;

a detent mechanism coupling with the first portion of the piston rod for holding the piston assembly in the first or second position, the detent mechanism further includes a bore in the second piston rod portion with a contacting member in the bore and a plunger coupled with the housing for coupling and releasing with the contacting member of the second piston rod portion; and an arm coupled with the second portion of the piston rod, the arm moving between a clamped and an unclamped position as the piston assembly moves between its first and second position.

9. The clamp of claim 8, further comprising at least one ball in the plunger for coupling and releasing the contact member.

10. The clamp of claim 9, wherein the plunger includes a pin slidable in the plunger, the pin moving the at least one ball into its coupling and releasing positions.

11. The clamp of claim 10, wherein the pin is coupled with a second piston, the second piston is movable in the housing for moving the pin.

* * * * *